(12) United States Patent
Al-Khowaiter et al.

(10) Patent No.: US 9,503,422 B2
(45) Date of Patent: Nov. 22, 2016

(54) APPARATUS, SYSTEMS, PLATFORMS, AND METHODS FOR SECURING COMMUNICATION DATA EXCHANGES BETWEEN MULTIPLE NETWORKS FOR INDUSTRIAL AND NON-INDUSTRIAL APPLICATIONS

(71) Applicant: Saudi Arabian Oil Company, Dhahran (SA)

(72) Inventors: Ahmad O. Al-Khowaiter, Dhahran (SA); Soloman Almadi, Dhahran (SA); Zakarya AbuAlSaud, Dhahran (SA); Soliman A. Al-Walaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 77 days.

(21) Appl. No.: 14/274,279

(22) Filed: May 9, 2014

(65) Prior Publication Data
US 2015/0326582 A1 Nov. 12, 2015

(51) Int. Cl.
*H01L 29/06* (2006.01)
*H04L 29/06* (2006.01)
*H04L 29/08* (2006.01)

(52) U.S. Cl.
CPC ....... *H04L 63/0209* (2013.01); *H04L 63/0245* (2013.01); *H04L 63/105* (2013.01); *H04L 63/14* (2013.01); *H04L 67/06* (2013.01); *H04L 67/1097* (2013.01); *H04L 63/18* (2013.01); *Y02B 60/46* (2013.01)

(58) Field of Classification Search
CPC ............. H04L 63/105; H04L 67/1097; H04L 63/0245; H04L 67/06
See application file for complete search history.

(56) References Cited

U.S. PATENT DOCUMENTS 5,550,984 A 8/1996 Gelb
6,052,530 A 4/2000 Buzbee
(Continued)

FOREIGN PATENT DOCUMENTS

| DE | 102004034902 | 9/2005 |
|---|---|---|
| WO | 9942915 | 8/1999 |
| WO | 9946882 | 9/1999 |

OTHER PUBLICATIONS

Tate et al., Introduction to Storage Area Networks and System Networking, Nov. 2012, International Business Machines, p. 3, 20-26, 116-117, 208-211.*

(Continued)

*Primary Examiner* — Joseph P Hirl
*Assistant Examiner* — Stephen Gundry
(74) *Attorney, Agent, or Firm* — Bracewell LLP; Constance G. Rhebergen; Christopher L. Drymalla

(57) ABSTRACT

Apparatus, systems, network platforms, and methods of providing secure communication between multiple networks, and program product for managing heat exchanger energy efficiency and retrofit for an industrial facility, are provided. According to an exemplary apparatus, the apparatus can include provisions for preventing uninterrupted application-to-application layer communications between the one or more secured networked members and the one or more networked enterprise members to thereby eliminate active files from being communicated, preventing communication of active files or other vulnerable files, and preventing establishment of active links or sessions, between the one or more secured networked members and the one or more networked enterprise members.

36 Claims, 5 Drawing Sheets

(56) References Cited

U.S. PATENT DOCUMENTS

| | | | | |
|---|---|---|---|---|
| 6,640,278 | B1* | 10/2003 | Nolan | G06F 3/0601 707/999.001 |
| 6,704,873 | B1 | 3/2004 | Underwood | |
| 6,839,746 | B1* | 1/2005 | Muthiyan | H04L 29/06 709/220 |
| 7,484,055 | B1* | 1/2009 | Gupta | H04L 29/12056 709/223 |
| 7,546,334 | B2 | 6/2009 | Redlich | |
| 7,577,729 | B1* | 8/2009 | Umbehocker | G06F 3/0607 709/213 |
| 7,643,468 | B1* | 1/2010 | Arregoces | H04L 12/462 370/351 |
| 7,656,884 | B1* | 2/2010 | DeSanti | H04L 41/082 370/360 |
| 7,664,839 | B1* | 2/2010 | Karr | G06F 3/0604 709/223 |
| 7,783,788 | B1* | 8/2010 | Quinn | G06F 9/5077 710/10 |
| 7,937,365 | B2 | 5/2011 | Prahlad | |
| 8,275,897 | B2 | 9/2012 | Fallon | |
| 8,543,710 | B2* | 9/2013 | Turley | H04L 63/105 709/224 |
| 8,725,878 | B1* | 5/2014 | Gillam | H04L 41/0836 709/226 |
| 8,805,951 | B1* | 8/2014 | Faibish | G06F 9/5072 709/213 |
| 8,838,793 | B1* | 9/2014 | Thrasher | H04L 67/1097 709/223 |
| 9,077,752 | B2* | 7/2015 | Lam | H04L 67/16 |
| 2002/0095602 | A1* | 7/2002 | Pherson | H04L 63/101 726/1 |
| 2002/0161982 | A1* | 10/2002 | Riedel | G06F 3/0608 711/170 |
| 2002/0198897 | A1* | 12/2002 | Geuss | G06F 17/30569 |
| 2003/0085914 | A1* | 5/2003 | Takaoka | H04L 41/22 715/734 |
| 2003/0131262 | A1* | 7/2003 | Goddard | H04L 63/0218 726/11 |
| 2003/0142628 | A1* | 7/2003 | Alonso | H04L 29/06 370/241 |
| 2003/0236688 | A1* | 12/2003 | Kadaba | G06Q 10/025 705/6 |
| 2006/0245361 | A1* | 11/2006 | Cheethirala | H04L 47/125 370/238 |
| 2006/0262784 | A1* | 11/2006 | Cheethirala | H04L 67/1097 370/389 |
| 2007/0067589 | A1* | 3/2007 | Mishra | H04L 67/125 711/163 |
| 2007/0143552 | A1* | 6/2007 | Rastogi | H04L 63/1458 711/154 |
| 2008/0130897 | A1 | 6/2008 | Donatelli | |
| 2008/0177576 | A1 | 7/2008 | Jennings | |
| 2009/0296723 | A1 | 12/2009 | Chang | |
| 2010/0042832 | A1 | 2/2010 | Fujibayashi | |
| 2010/0299447 | A1 | 11/2010 | Salvi | |
| 2010/0299742 | A1* | 11/2010 | Declety | H04L 63/0209 726/13 |
| 2011/0067096 | A1* | 3/2011 | Chakarapani | H04L 41/0806 726/14 |
| 2011/0110568 | A1* | 5/2011 | Vesper | G06F 19/321 382/128 |
| 2011/0153351 | A1* | 6/2011 | Vesper | G06Q 10/10 705/2 |
| 2011/0238403 | A1 | 9/2011 | Sargaison | |
| 2011/0276728 | A1* | 11/2011 | Otani | G06F 3/062 710/37 |
| 2012/0185911 | A1 | 7/2012 | Polite | |
| 2013/0212386 | A1* | 8/2013 | Rastogi | H04L 9/3263 713/168 |
| 2013/0326610 | A1* | 12/2013 | Al-Khabbaz | H04L 63/0209 726/13 |
| 2014/0365622 | A1* | 12/2014 | Iyengar | H04L 67/1097 709/220 |
| 2015/0254088 | A1* | 9/2015 | Chou | G06F 9/45541 709/212 |

OTHER PUBLICATIONS

International Search Report and Written Opinion for PCT/US2015/029925 dated Aug. 19, 2015; pp. 1-14.

* cited by examiner

APPARATUS, SYSTEMS, PLATFORMS, AND METHODS FOR SECURING COMMUNICATION DATA EXCHANGES BETWEEN MULTIPLE NETWORKS FOR INDUSTRIAL AND NON-INDUSTRIAL APPLICATIONS

BACKGROUND OF THE INVENTION

1. Field of the Invention

This invention relates generally to communication between a plurality of network domains or zones, and more particularly to network platforms and apparatus, systems, and methods that utilize or employ internetworking platforms to provide cyber security protection across security zones typically having different levels of security therebetween.

2. Description of the Related Art

The architecture of modern industrial operations, such as that found in modern oil and gas field applications is enabled at the field-level, process-level, application-level, system-level, and plant-level, by various networked devices. These devices monitor, control, and collect data, such as measurements, reflective of the operations of the automated process. These devices are connected to or in communication with electronic devices and machines known as controllers that operate at different levels to process the data collected and issue commands back to, or to other, networked devices.

In a typical configuration, these components form plant networks and systems. The more mission-critical remote or local plants, facilities, systems, networks, applications, controllers, computers or other data management devices, sensors or other data collecting or transmitting devices including I/O devices, equipment (things), and/or other assets, are located in what can be termed a mission critical Secured Zone (SZ). These industrial networks and systems can be connected to multiple networks within the SZ or non-mission-critical networks external to the facility, such as a corporate or other enterprise network, located within a Less Secured Zone (LSZ) having less cyber security, which may also be connected to public networks such as the Internet. This makes such "industrial networks" extremely susceptible to external cyber attacks and other security threats. Such cyber attacks can result in, among other things, a "loss of view" and/or a "loss of control" of individual components or entire network or system structures. A loss of view occurs when the user/automated controller is unable to access a system, either partially or fully, and thus, has no view of the process operation. A loss of control occurs when the user/automated controller is unable to send and/or receive control messages to the process control system to invoke a function and or a procedure.

Cyber security measures applied to communication between such mission-critical industrial networks and systems and have taken the form of those applied to Information Technology (IT) systems, arguably because known conventional intra-network deployments require full Internet Protocol (IP) communication end-to-end between the data source and destination. Other methodologies include the employment of the need for a Firewall and/or DMZ between the SZ and LSZ. These methods, however, have not been sufficiently effective, given the potential loss of capital, life, and product in the event of a failure of a control system or industrial process.

As such, the inventors have recognized the need for apparatus, systems, network platforms, and methods that can provide cyber security protection for industrial processes, for Energy, Power and Utilities systems and networks; and other industrial and non-industrial systems, that require, for example, security and protection from a less secure corporate or Internet connectivity. Also recognized is the need for apparatus, systems, platforms, and methods that can provide secure communications between the different zones such as, for example, a mission critical SZ interfacing with facilities, systems, networks, computers or other user interface devices including those of end-users located in an LSZ, and that account for the full IP communication requirement of both data sources and data destinations.

Further recognized by the inventors is the need for apparatus, systems, platforms, and methods which provide for data exchange from the SZ to the LZ without full (unbroken and anti-evasion) IP communication end-to-end; that can eliminate the exchange of vulnerable files and malwares between the SZ and LSZ, and vice versa; that can eliminate active links or sessions (bidirectional) between the SZ and LSZ; provide for controlled data exchange between SZ and LSZ; that can prevent active files, those files having executable code and/or macros that cannot be transferred as a text file(s) or binary data, e.g., URL links, object oriented executable file, among others, which can be carriers of computer worms or viruses, from being exchanged between the SZ and LSZ; vice versa, by eliminating them from any data being exchanged; that can provide data exchange capabilities, preferably at the storage drive I/O level between two different zones; and that can eliminate the need for network communication such IP communications, physical Firewall(s) and/or DMZ(s) between the SZ and LSZ.

Once there is a system compromise of the Enterprise Resource Planning (ERP) storage, for example, or a compromise either in the corporate network or corporate LAN, any streaming data is generally lost, en route, or must be stored by the data source.

As such, recognized by the inventors is the need for an en route storage capacity to retain the data should the ERP storage become compromised or if data being transferred to the LSZ is being lost. Correspondingly, also recognized by the inventors is the need for apparatus, systems, platforms, and methods which provide for central data aggregation and delivery to the LSZ's systems (and LZ systems) and/or for manual data upload or download for disaster situations such as, for example, a central hub for data aggregation and exchange; which provide central data aggregation to be used in a disaster recovery plan; and which provide a central data aggregation for the SZ and LSZ systems to be used for data archiving and historization.

SUMMARY OF THE INVENTION

In view of the foregoing, various embodiments of the present invention advantageously provide apparatus, systems, network platforms, and methods, that can provide cyber security protection for industrial processes, for Energy, Power and Utilities systems and networks, and other industrial and non-industrial systems, that require, for example, security and protection from a less secure corporate or internet connectivity. Various embodiments also provide apparatus, systems, network platforms, and methods that can provide secure communications between the different zones such as, for example, a mission critical Secured Zone (SZ) interfacing with facilities, systems, networks, computers or other user interface devices including those of end-users located in a Less Secured Zone (LSZ), and that account for the full IP communication requirement of both data sources and data destinations.

Various embodiments also provide apparatus, systems, platforms, and methods which provide for data communications (exchanges) from the SZ to the LZ without full (unbroken) and anti-evasion IP communication end-to-end; that can eliminate the exchange of vulnerable files between the SZ and LSZ, and vice versa; that can eliminate active links or sessions (bidirectional) between the SZ and LSZ; provide for controlled data exchange between SZ and LSZ; that can prevent active files, those files having executable code and/or macros that cannot be transferred as a text file, e.g., URL links, object oriented executable file, among others, which can be carriers of computer worms or viruses, from being exchanged between the SZ and LSZ; vice versa, by eliminating them from any data being exchanged; that can provide data exchange capabilities, preferably at the hard drive I/O level between two different zones; and/or that can eliminate the need for a Firewall and/or DMZ between the SZ and LSZ.

Additionally, various embodiments of the invention advantageously provide apparatus, systems, network platforms, and methods that provide data availability and integrity by completely hiding the means of data transport to prevent unauthorized access to the entire data stream regardless of its data classification. Additionally, the various embodiments break the IP address reachability at the lowest level (i.e., I/O hard-drive) and retransmit the data utilizing the data transmission at the storage drive level coupled with intermediate servers for actual raw data translation and formatting by adjacent servers, e.g., DSMs, rather than the concept of TCP/IP proxy server model used between different networks.

Various embodiments also provide apparatus, systems, platforms, and methods which provide for an en route storage capacity to retain the data should the ERP storage become compromised or if data being transferred to the LSZ is being lost; which provide for central data aggregation and delivery to the LSZ's systems (and LZ systems) and/or for manual data upload or download for disaster situations such as, for example, a central hub for data aggregation and exchange; which provide central data aggregation to be used in a disaster recovery plan; and/or which provide a central data aggregation for the SZ and LSZ systems to be used for data archiving and historization.

More specifically, an example of an embodiment of an apparatus for securing communication data exchanges between multiple networks utilizing storage area network internetworking platforms. The exemplary apparatus can include an exemplary platform that can function to eliminate IP connections between a secured zone, or SZ, and less secured zone, or LSZ, for bi-direction data exchange. The platform function, according to an exemplary configuration, is based on exchanging data between a first network, typically including mission-critical assets (members) to form the SZ, and a second network, typically including non-mission critical members to form the generally less secured, LSZ. Data transfer between zones can be at the storage level such as, for example, at the virtual block level, input/output (I/O) level, plain text or binary file storage level. The platform storage is designated to be accessed from one side of the communications pathway between zones by systems or components associated with the SZ and accessed from the other side by systems or components associated with LSZ.

The exemplary platform can include the following major components: a centralized facility; and/or a Secured Dedicated Communication Link Module (SDCLM) coupled with the respective centralized facility. According to alternative embodiments, a distributed facility can be used. The centralized or distributed facilities can each include: a first, typically dedicated LAN, one or more sets of Data Staging Modules (DSMs); one or more storage area network (SAN) storage and exchange systems, each typically in the form of a SAN Inter-networking Module (SAN IM) bounded by at least a pair of the DSMs; and at least one second LAN, typically associated with an Enterprise network or system. The centralized facility can form non-shared hybrid IP packet network including IP communications interrupted by non-IP communications across the SAN storage and exchange systems allowing data exchange.

The data exchange through the SAN system is based on storage exchange, virtual block, I/O layer, i.e., storage drive layer to provide data exchange based non-IP communications between two different layers, networks, systems, plants, facilities, and/or other data sources (data originators) and data destinations (data terminators). This is in contrast to providing data exchange based on the software application (API) layer or IP network layer. This data exchange form can advantageously provide for communications between both data originators and data terminators that utilize IP communications as their communication base, while still preventing active files, those files having executable code and/or macros that cannot be transferred as a text or binary file, e.g., URL links, object oriented executable file, among others, which can be carriers of computer worms or viruses, from being exchanged between the data sources and data destinations located within the SZ and LSZ; vice versa, automatically eliminating them as part of the between-zones exchange process.

The DSMs typically include at least one located in the SZ and one located in the LSZ. Each DSM includes one or more aggregator servers or other computers, and/or one or more data servers or other computers. The SAN IM typically includes a SAN switch or fabric containing one or more SAN switches, and at least one set of interfaces/data storage centers, with each set including an SZ-SAN storage unit and an LSZ-SAN storage unit, connected to and bounding the SAN switch or fabric. The SAN switch or fabric is used to exchange the data between SZ and the LSZ at the storage exchange, virtual block, I/O layer, e.g., storage drive data layer, utilizing flat files, e.g., binary files or plain text files including printable characters, which provide for an intermediate a non-IP, non-Ethernet form of data exchange.

The SZ- and LSZ-SAN storage units, residing in the same storage enclosure or different storage enclosures that can be co-located or far apart from each other, provide at least one, but more typically a plurality of SAN volumes or logical drives, with each SAN volume providing a single accessible storage area to the respective server in the respective zone. Mirror of the original storage volumes can be created on the SZ- and LSZ-SAN storage units by the respective SZ and LSZ DSMs to be used when both read and write access to the data in the original storage volumes is needed by the respective SZ and LSZ applications.

The SDCLM can include: an Ethernet switch to establish the dedicated LAN; at least one network security device to protect the dedicated LAN; and a dedicated communication circuit (channel) used for linking various data sources to the non-shared hybrid IP packet network, directionally or bi-directionally. The at least one network security device can include a firewall positioned, for example, between at least substantial, if not entire portions of the dedicated communication circuit. The dedicated communication circuit can include, for example, a transmission network bounded by one or more network security device, and a set of transmission access/egress nodes, typically one for each plant LAN or other connected network. In this embodiment, one or more network security device can include, for example, one or more firewalls for each plant LAN or other connected network.

An exemplary embodiment of an apparatus including a network platform providing cyber security protection is provided. The network platform can advantageously provide cyber security protection for one or more local or remote networks, networked systems, networked assets, or other data sources defining one or more secured networked members associated with a first domain or zone defining a first network zone having a first level of network security in communication with one or more local or remote networks, systems, or end-user devices defining one or more networked enterprise members associated with a second domain or zone defining a second network zone having a second level of network security. According to the exemplary embodiment, the network platform includes a first set of one or more computers defining a first data staging module (DSM) associated with the first network zone having the first level of network security, and configured to receive or retrieve data from the one or more secured networked members associated with the first network zone; a second a set of one or more computers defining a second DSM associated with the second network zone having the second level of security, and configured to receive or retrieve data from the one or more networked enterprise members associated with the second network zone; and a storage area network (SAN) storage and exchange system bounded by the first and second DSMs. The SAN storage system can include one or more SAN storage units containing a first set of one or more storage volumes accessible to the first DSM, and a second set of one or more storage volumes accessible to the second DSM, and a non-transitory communication medium configured to provide for data communications between the first set of one or more storage volumes and the second set of one or more storage volumes to thereby provide a data pathway between the first network zone and the second network zone. According to the exemplary embodiment of the network platform is configured to prevent uninterrupted application-to-application layer communications between the one or more secured networked members and the one or more networked enterprise members to thereby eliminate active files from being communicated, preventing communication of active files or other vulnerable files, and preventing establishment of active links or sessions, between the one or more secured networked members and the one or more networked enterprise members.

Another exemplary embodiment can include, for example, an apparatus including a network platform for providing cyber security protection for one or more local or remote networks, networked systems, networked members, or other data sources defining one or more secured networked members associated with a first domain or zone defining a first network zone having a first level of network security in communication with one or more local or remote networks, systems, or end-user devices defining one or more networked enterprise members associated with a second domain or zone defining a second network zone having a second level of network security. The network platform a first set of one or more computers defining a first data staging module (DSM) associated with the first network zone having the first level of network security, and configured to receive or retrieve data from the one or more secured networked members associated with the first network zone; a second a set of one or more computers defining a second DSM associated with the second network zone having the second level of security, and configured to receive or retrieve data from the one or more networked enterprise members associated with the second network zone; and a storage area network (SAN) storage and exchange system bounded by the first and second DSMs. The SAN storage system can include a first SAN storage unit operably coupled to the first DSM and configured to contain a first set of one or more storage volumes accessible by the first DSM, a second SAN storage unit operably coupled to the second DSM and configured to contain a second set of one or more storage volumes accessible by the second DSM, and a SAN switch or fabric containing one or more SAN switches defining a switched fabric, the switched fabric operably coupled between the first SAN storage unit and the second SAN storage unit and configured to provide for data communication therebetween to thereby provide a data pathway between the first network zone and the second network zone.

According to such embodiment, the data communication between the first SAN storage unit and the second SAN storage can include a data communication between one or more associated pairs of the first and the second sets of storage volumes, a first storage volume of each pair of storage volumes is directly accessible by the first DSM and not directly accessible by the second DSM, and a second storage volume of each pair of storage volumes is directly accessible by the second DSM and not directly accessible by the first DSM. Also or alternatively, the data communication between the first SAN storage unit and the second SAN storage unit can include a data replication and block volume transfer between a first storage volume and a second storage volume of each pair of one or more associated pairs of the first and the second sets of storage volumes.

According to another embodiment of an apparatus for providing cyber security protection for one or more mission critical local or remote networks, networked systems, networked assets, or other data sources defining one or more secured networked members contained within a secured zone (SZ) that must communicate with one or more non-mission critical local or remote networks, systems, end-user devices, or other data consumers defining one or more networked enterprise members contained within a Less Secured Zone (LSZ) or in communication with the one or more networked enterprise members, is provided. The apparatus can include a storage area network inter-networking platform including a first set of one or more computer servers defining a first DSM positioned within the SZ having a first level of network security; a second set of one or more computer servers defining a second DSM positioned within the LSZ and having a second level of network security, the second level of network security being less than the first level of network security; and a storage area network (SAN) storage and exchange system bounded by the first and the second DSMs and configured to exchange data between the SZ and the LSZ, each of which communicate internally based on one or more IP communication schemes, and to provide non-IP communication between the first DSM and the second DSM to prevent establishment of an IP connection between the SZ and the LSZ, to thereby provide secured communication therebetween. According to this embodiment, the SAN is used to exchange data (non-IP communication) between the SZ and the LSZ which each include communication internally based on IP communication schemes. Additionally, the SAN storage and exchange system can include a pair of separately dedicated DSM storage module volumes, with the first comprising a dedicated SZ DSM SAN volume, and the second comprising a dedicated LSZ SAN DSM volume; and the SAN storage and exchange system being configured to provide the non-IP communications through transferring replicated plain text files between the dedicated SZ DSM SAN volume and the dedicated LSZ DSM SAN volume.

According to an embodiment of a method of providing cyber security protection for one or more mission critical local or remote networks, networked systems, networked assets, or other data sources defining one or more secured networked members contained within an SZ that must communicate with one or more non-mission critical local or remote networks, systems, end-user devices, or other data consumers defining one or more networked enterprise members contained within an LSZ and in communication with the one or more networked enterprise members, is provided. The method can include the steps of preventing uninterrupted application-to-application layer communications between the one or more secured networked members and the one or more networked enterprise members by employing a network platform configured to interrupt IP-based data communications with non-IP-based communications. The step of preventing uninterrupted application-to-application layer communications can include the steps of: translating native files from at least one member of the one or more secured network members into one or more flat files, the translating step performed by a first computer server; communicating at least copies of the one or more flat files between a pair of SAN storage volumes, the first of the pair of storage volumes assigned to the SZ, the second of the pair of SAN storage volumes assigned to the LSZ, the LSZ having a security level less than that of the SZ; and re-translating the at least copies of the one or more flat files into a form usable by the second LSZ, the step of re-translating performed by a second computer server, with the communication between the two SAN volumes being in the form of a virtual block data volumes communication of virtual block data volumes containing the at least copies of the one or more flat files.

According to this embodiment, the one or more flat files comprises one or more plain text files, wherein the first computer server is a first data server comprised by at least portions of a DSM, wherein the second computer server is a second data server comprised by at least portions of a second DSM, and wherein the communication of the at least copies of the one or more flat files is performed by a SAN storage and exchange system bounded by the first and the second data servers and configured to exchange data between the SZ and the LSZ, each of which communicate internally based on one or more IP communication schemes, and to provide non-IP communication between the first computer server and the second DSM and to prevent establishment of an IP connection between the SZ and the LSZ to thereby provide secured communication therebetween. Additionally, the one or more flat files can generated from native files received by the first and the second DSMs for transfer to respective other of the first and the second DSMs.

Various embodiments of the invention advantageously include apparatus, equipment, functions, operations, methods, and designs for data exchange platforms between one or more sets of domains or zones, such as, for example, a SZ and an LSZ that can provide data exchange based at the storage device level, provide data aggregation and data recovery center, utilizing the capabilities of the DSM, and eliminate IP communication across interfaces between two different networks, systems, and/or facilities. Various embodiments also advantageously can provide secure data transmission methodologies that can utilize data flow translations between different databases and that utilize the data layer I/O to exchange the data between networks.

Various embodiments of the invention advantageously provide an apparatus including a network platform based upon: a non-shared hybrid IP packet network extending between a dedicated LAN and an Enterprise LAN, typically defining a centralized facility used for linking at least a pair of applications, zones, or networks having different security levels, such as, for example, set of plant networks and systems in an SZ, and set of corporate networks, systems, and remote users accessing an LSZ; and a dedicated communication circuit (channel) used for linking the plant networks and systems to the non-shared hybrid IP packet network.

Various embodiments of the invention provide methods of platform data exchange based on performing a data exchange at the storage exchange, virtual block, I/O layer, i.e., storage drive layer, utilizing flat files, e.g., plain text file or binary, to provide data exchange based non-IP communications between two different layers, networks, facilities that utilize IP communications as their communication base, in contrast to performing the data exchange at the software application (API) layer. This and the above described embodiments of the platform can advantageously be used for oil, gas, power and other industrial and non-industrial applications and facilities requiring secure data exchange.

Various embodiments of the invention can also advantageously include apparatus, systems, network platforms, and methods that can provide for central data aggregation to be used in a disaster recovery plan. The LZ-side DSM can provide for the data recovery in the event of a disconnection with a remote LZ facility and/or disconnection with or compromise of the LSZ network. Similarly, the LSZ-side DSM can provide for the data recovery in the event of a disconnection with a remote LSZ facility and/or disconnection with the LZ network. Advantageously, a central data aggregator in each network domain or zone (e.g., LC, LSZ) can be utilized in support of disaster recovery plan/business continuity plan to provide for primary storage and distribution of data such as, for example, whenever the corporate network is compromised and isolated. The aggregator servers have the capability to interface with end-users inside the central data aggregation zone.

Various embodiments of the present invention can provide secure data transmission methodologies that utilize data flow translations between different databases and that employ the data layer I/O to exchange data between networks. Advantageously, one or more pairs of DSMs can provide a bridge between the application layers on a first side of a SAN IM and can interwork with the SAN IM to send data across to the network to the second side of the SAN IM. Additionally, the plant-side DSM, for example, can be used as an intermediary for data exchanges with distributed and remote plant facilities and can be responsible for data recovery in the event of disconnection with a remote plant facility and/or disconnection with the corporate network.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
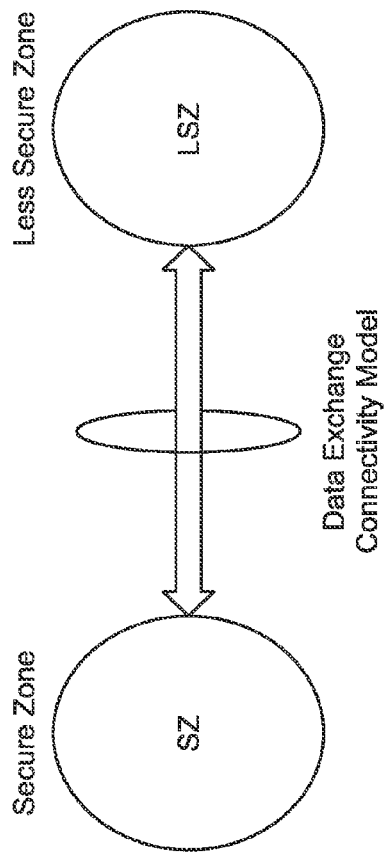
FIG. 1 is a graphical depiction of a data exchange connectivity platform model between a pair of domains or zones having different security levels, a mission critical Secured Zone (SZ) and a non-mission critical Less Secured Zone (LSZ), according to an embodiment of the present invention.

FIG. 1 illustrates an exemplary data exchange connectivity platform model between a pair of domains or zones having different security levels. Secure communication between the different zones such as, for example, a mission critical Secured Zone (SZ), e.g., critical remote or local plants, facilities, systems, networks, applications, controllers, computers or other data management devices, sensors or other data collecting or transmitting devices (including I/O devices), equipment (things), and/or other assets or a combination thereof, interfacing with a non-mission critical Less Secured Zone (LSZ), e.g., facilities, systems, networks, computers or other user interface devices including those of end-users, can be considered essential to modern industrial process, power and utilities systems and networks, and other industrial and non-industrial systems. Such systems and networks generally require, for example, security and protection from a less secure corporate or internet connectivity.

Note, the terms "data exchange" and "data communication" can refer to both a one-way communication of data, such as, for example, transferring a file or transferring a copy of a file as a result of sending or retrieving data over a communications media, as well as, but can include a two-way communication of the data.

In order to provide cyber security protection for such systems and networks, various embodiments of the invention beneficially include apparatus, systems, network platforms, and methods that provide for eliminating the exchange of vulnerable files between the SZ and LSZ, and vice versa; eliminating active links or sessions (bi-directional) between the SZ and LSZ; and/or provide for controlling data exchanges between SZ and LSZ; central data aggregation and delivery to the LSZ systems (and LZ systems) for manual data upload or download for disaster situations; and/or central data aggregation for the SZ and LSZ systems to be used for data archiving and historization. Such embodiments can also or alternatively provide secure data transmission methodologies that can utilize data flow translations between different databases and that utilize the data layer I/O to exchange the data between networks. Note, although the terms "secured zone" or "SZ" and "less secured zone" or "LSZ" are utilized throughout, one of ordinary skill in the art would recognize that the embodiments of the invention described herein are directly applicable to the provision of cyber security protection across networks having the same or similar security levels forming separate zones being equally or approximately equally secured.

Figure 2:
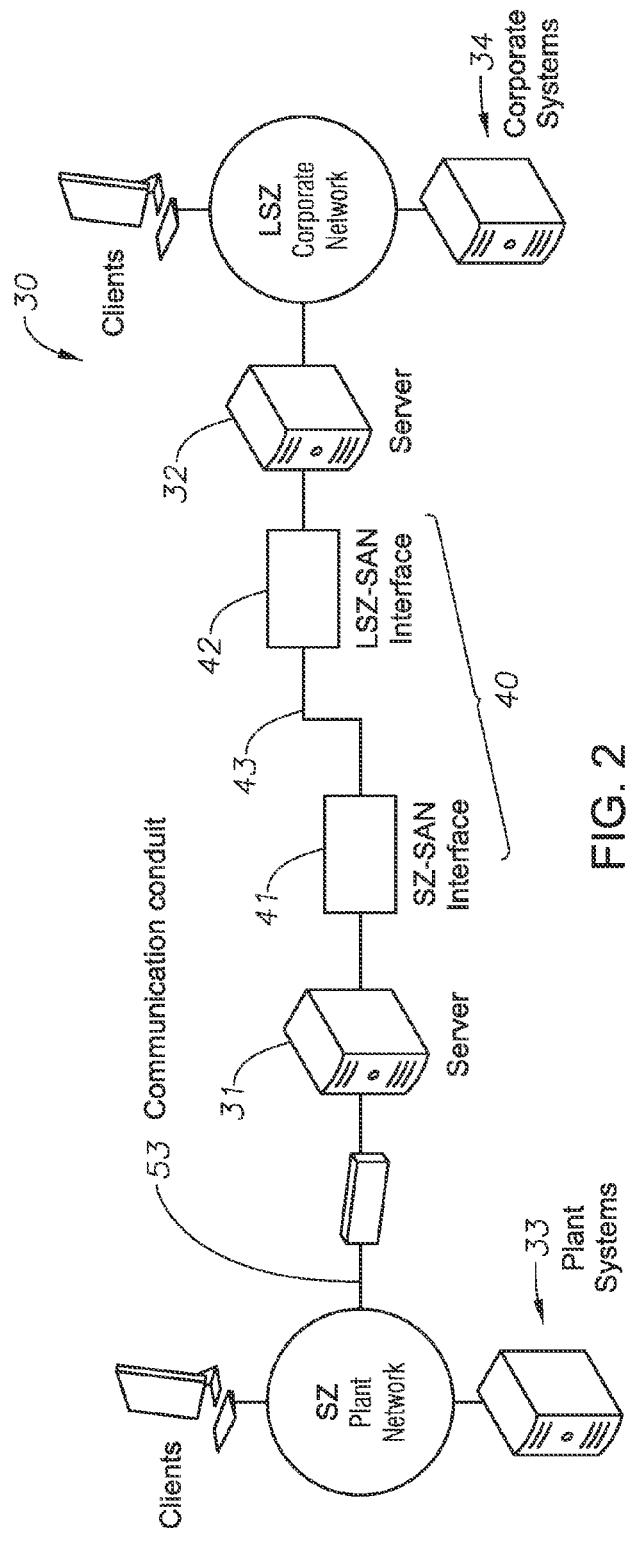
FIG. 2 is a graphical diagram illustrating an exemplary basic model of an internetworking platform located between the SZ and the LSZ, according to an embodiment of the present invention.

FIG. 2 illustrates an exemplary basic model of an internetworking platform 30 located between an SZ and an LSZ. The platform 30 provides for the provision of cyber security protection, for example, for "mission critical" assets, e.g., a plant network or networks, plant systems, plant client devices, remote or local plants, facilities, systems, either networks, applications, controllers, computers or other data management devices, sensors or other data collecting or transmitting devices (including I/O devices), and equipment (things) or a combination thereof, collectively referred to as plant systems or other data sources, located within the SZ, which communicate or otherwise interface, for example, with "non-mission critical" assets, e.g., a corporate network or networks, corporate systems, client end-user devices, remote or local facilities, systems, other networks, applications, computers or other information management devices, or a combination thereof, located within the LSZ. The components of the exemplary platform 30 can be hardened with application cyber security restriction, access, and antivirus capabilities. Physical security for the platform elements and upkeep workflows are defined, as understood by one of ordinary skill in the art. The platform 30 can serve as a means for data exchange of oil and gas application, power, utilities, among others, eliminating the need for an IP connection with corporate or other typically less secured networks, including the Internet.

The platform 30 can provide for data exchange based at the storage device level, provide for: data exchange from the SZ to the LSZ without full (uninterrupted) IP communication end-to-end, elimination of IP communication across interfaces between two different networks, systems, and/or facilities within the SZ and the LSZ, and a data aggregation and data recovery center (described later). According to an exemplary configuration, the platform 30 includes intermediate sets of computer servers 31, 32, in each zone, such as, for example, an aggregator 181, 182 and/or a data server 191, 192 (see FIG. 3), described later, positioned at both sides of a Storage Area Network (SAN) 40 to translate and retranslate the native files to applications and servers of end systems 33, 34, e.g., plant systems 33 and corporate systems 34. The SAN 40 can beneficially be used to interrupt what would otherwise be a full IP network connection between the plant systems 33 associated with the SZ and corporate systems 34 associated with the LSZ, resulting in the elimination of the need for a firewall and/or a DMZ between the SZ and LSZ.

The SAN 40 can include an SZ-SAN interface 41 and an LSZ-SAN interface 42, residing in the same storage enclosure or different storage enclosures. Each SAN interface 41, 42, contains at least one, but typically a plurality of SAN volumes or logical drives each providing a single accessible storage area to the respective server 31, 32.

The SAN 40 can also include one or more switches. In a preferred configuration, the one or more switches are part of a switched fabric, or more typically, a switched fabric in Fiber Channel defining a Fiber Channel SAN fabric 43 comprising one or more Fiber Channel SAN switches (not separately shown). The data exchange can be between two SAN volumes, residing in the same storage enclosure or different storage enclosures, utilizing, for example, the small computer system interface (SCSI) and/or Fiber Channel protocols. Other protocols providing similar functionality are, however, within the scope of the present invention.

The platform 30 can beneficially utilize a dedicated communications conduit or circuit 53 based on dedicated channels such as Synchronous Digital Hierarchy (SDH), Synchronous Optical Networking SONET, Wave Division Multiplexing, dedicated cable, Digital Subscriber Line (DSL), dedicated fiber, and/or, e.g. various forms of other non-shared IP packet networks as understood by those of ordinary skill in the art, to establish independence from the public and/or private shared IP network for plant data. The platform 30 can provide for data exchange between the SZ and the LSZ utilizing a centralized SAN data exchange model (see FIG. 3) and/or a distributed SAN data exchange model (see FIG. 6).

Figure 3:
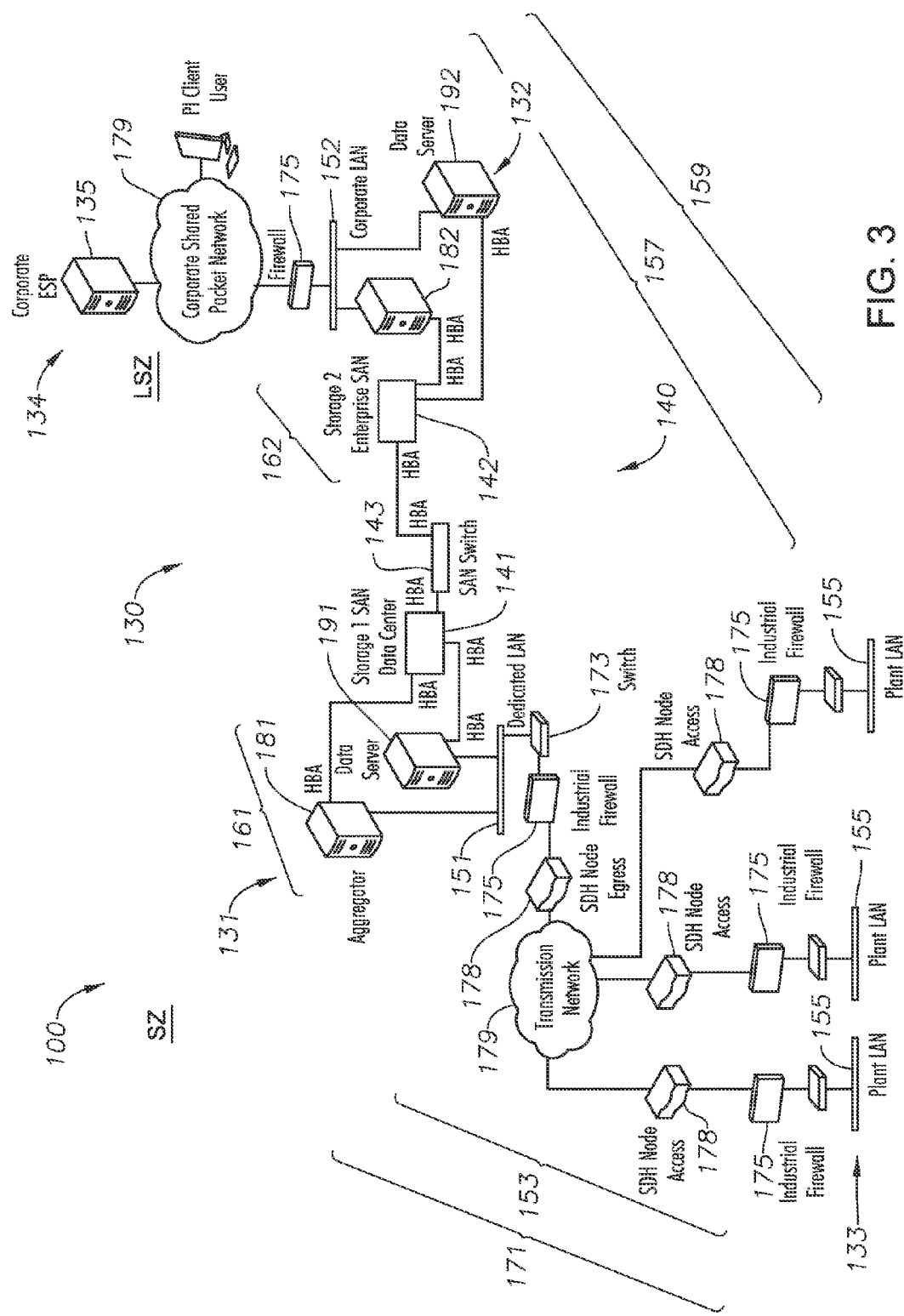
FIG. 3 is a graphical diagram illustrating an exemplary apparatus including an exemplary network platform containing a centralized facility, in the form of a centralized storage area network data exchange model, configured to eliminate Internet protocol (IP) connections between a secured zone, or SZ, and less secured zone, or LSZ, for bi-direction data exchange, according to an embodiment of the present invention.

FIG. 3 illustrates an exemplary apparatus 100 comprising an exemplary network platform 130 configured to eliminate IP connections between a secured zone, or SZ, and less secured zone, or LSZ, for bi-direction data exchange. For example, according to an exemplary configuration, the platform data exchange function is performed at the storage exchange, virtual block, I/O layer, i.e., storage drive layer, utilizing flat files, e.g., plain text file or binary, to provide data exchange based non-IP communications, e.g., non-Ethernet form of data exchange, between two different layers, applications, systems, networks, facilities, plant equipment, and/or other data consumers or producers, which utilize IP communications as their communication base. This is in contrast to conventional applications which provide data exchange based upon the software application (API) layer. Beneficially, the network platform 130 can be used according to various communication schemes and users, to include use in, for example, oil, gas, power and other industrial and non-industrial applications, networks, and facilities requiring cyber secure data exchanges. The platform 130, however, can be used for other purposes as would be understood by those of ordinary skill in the art.

According to the illustrated embodiment, the functionality of the exemplary network platform 130 is based primarily upon: a non-shared hybrid IP packet network extending between a dedicated LAN 151 and an Enterprise (e.g., corporate, other) LAN 152, and is used to exchange the data between SZ and the LSZ; platform storage designated to be accessed from one side by systems or components associated with the SZ and accessed from the other side by systems or components associated with LSZ; and optionally, a dedicated communication circuit (channel) 153 used for linking various data sources to the non-shared hybrid IP packet network, directionally or bi-directionally. The data sources can include, for example, critical or non-critical remote or local plants, facilities, systems, networks, applications, controllers, computers/servers or other data management devices, sensors or other data collecting or transmitting devices (including I/O devices), equipment (things), and/or other assets or a combination thereof, collectively referred to as data sources or plant systems 133 for simplicity. The linking can be either directly with the plant system 133 or via an interface with their respective LANs 155. Note, the non-shared hybrid IP packet network is referred to as being a hybrid because it can include both IP communications interrupted by non-IP communications.

The exemplary network platform 130 includes a "centralized facility" 157 in the form of an exemplary baseline centralized SAN data exchange model that contains the dedicated LAN 151, a set of Storage 1 and 2 infrastructures 161, 162, and an Enterprise LAN 152. The Storage 1 and 2 infrastructures 161, 162, collectively include Data Staging Modules (DSMs) 131, 132, and a SAN Inter-Networking Module (SAN IM) 140 extending therebetween and used to exchange the data between the SZ and the LSZ. Together, the components of the centralized facility 157 form the non-shared hybrid IP packet network which can perform the data exchange between zones using a non-IP, non-Ethernet form of data exchange. Additionally, the centralized facility 157 in conjunction with the dedicated communication channel 153 form a secured link 159.

The exemplary centralized facility 157 is bounded on one side by the dedicated circuit (channel) 153, and on the other side by a non-dedicated circuit, i.e., corporate shared IP packet communication network forming at least substantial portions of LSZ. Other configurations of the baseline centralized facility model, however, are within the scope of the present invention. For example, according to an alternative embodiment, the non-shared hybrid IP packet network can instead be bounded by two different non-dedicated circuits (i.e., packet communication networks).

Other alternative centralized facility models are also within the scope of the present invention. For example, according to an alternative embodiment, the centralized facility 157 includes the dedicated LAN 151 with the Storage 1 infrastructure 161 in communication with a remote facility with the Storage 2 infrastructure 162 and enterprise LAN 152. Also for example, according to another alternative embodiment, the centralized facility includes the dedicated LAN 151 and Storage 1 infrastructure 161 and Storage 2 infrastructure 162, and a remote facility with the corporate LAN 152.

Still referring to FIG. 3, the network platform 130 can also include a Secured Dedicated Communication Link Module (SDCLM) 171. The hardware components of the SDCLM 171 can include, for example: an Ethernet switch 173 to establish the dedicated LAN 151, a network security device 175, such as, for example, one or more Firewalls 175 to protect the LAN 151; a dedicated communication circuit (channel) 153 including, for example, a transmission network 177 bounded by the network security device 175, e.g., the four firewalls 175, and a set of transmission access/egress nodes 178, and corresponding optical or electric cables and/or wireless transmitters and receivers. The software components include centralized software having the capability to interface into the different SDCLM 171 hardware that collects performance events. The software also has the capability to track events, monitor, correlates and identify abnormalities. The software can also alert cyber security compromises locally on a system display and/or remotely to a centralized Security operation center, as would be understood by one of ordinary skill in the art.

According to an exemplary embodiment, the dedicated communication circuit 153 is based on dedicated channels such Synchronous Digital Hierarchy (SDH); Synchronous Optical Networking (SONET), Wave Division Multiplexing (WDM), dedicated fiber strand, Digital Subscriber Line (DSL), and/or cable. The SDCLM 171 utilizes non-public or shared private IP. It implies a secured conduit based on either a dedicate IP over Ethernet and/or Serial communication over the communication link. The dedicated communication circuit (channel) 153 is bounded by the network security device 175, e.g., firewalls 175. The four firewalls 175, typically hardware-based or a combination of both hardware and software, are positioned to restrict access to, and securely isolate the transmission network 177, allowing only those protocols and data that are authorized to enter the transmission network 177, preventing the spread of malicious code. The SDCLM 171 beneficially provides the required capability to connect the plant systems 133 to the network platform 130.

Referring to FIG. 3, as briefly introduced above, according to an exemplary embodiment, the network platform 130 includes one or more first zone DSMs 131 each defining an SZ DSM 131 is/are placed at the first zone or SZ, and one or more second zone DSMs 132 each defining an LSZ DSM 132 is/are placed at the second zone or LSZ. The SZ and LSZ DSMs 131, 132, are data hubs to collect all data that needs to be exchanged between the different zones. Each DSM 131, 132, will collect the data corresponding to the networks and systems or other data sources belonging to a single one of at least two Security Zones that it is associated with. The SZ DSM 131, for example, is connected to various local and/or remote plant systems 133 or other data sources via the SDCLM 171, and is used as a buffer and staging area for all data entering or exiting that SZ. The LSZ DSM 132 can, but need not, utilize a less secure network connection such as a shared packet switched network to include the Internet to carry the data to the end users. Each DSM 131, 132, is bounded by a security apparatus, e.g., a firewall 175, from one communication side and the SAN storage infrastructure, e.g., SAN IM 140, on the other. The SAN storage infrastructure is located in between the SZ DSM 131 and the LSZ DSM 132.

Each DSM 131, 132, has the function of transferring data such as time series data from one data source to destination. The data sources can be single threaded, multi-thread and/or multi-session data sources originating from a single and/or multiple application programming interfaces (APIs). The SZ DSM 131 communicates with the SZ data sources, e.g., plant systems 133, using one or more dedicated communication circuits (channels) 153, or other preferably secure circuits or conduits, that can be based on IP or serial communication. The SZ data sources include, for example, one or more servers located at or otherwise associated with the plant systems 133, remote or local. The data sources, typically within or constituting the respective plant systems 133, can include, for example, oracle, SQL, or other database servers as known to one of ordinary skill in the art, serving the respective plant systems 133. The data sources can also be, for example, a server running an application that exchanges data templates based on TCP/IP or UDP/IP.

According to an exemplary configuration, the SZ DSM 131 and LSZ DSM 132, forming part of the exemplary centralized facility 157, can each include one or more aggregators 181, 182 and/or one or more data servers 191, 192, respectively, and corresponding DSM software stored thereon, to provide for a broad range of different data types and communication characteristics of the various plant systems 133. The aggregators 181, 182, which can be servers, are responsible for collecting data from the different plant systems 133 or other data sources, by establishing communications, databases templates quarries, data exchanges, a data filing library or libraries for each plant/facility, or alternatively, each individual plant system component, and data transmission management. The primary means of data exchanges is generally based on standard database formats such as SQL database interfaces. The complementing data servers 191, 192, are responsible for supporting data exchanges at the Application-to-Application layers based on utilizing standard protocols support, for example, by TCP/IP or UDP/IP ports.

According to an exemplary configuration and function, the source and destination servers are at the SZ DSM 131, or at the remote or local location of the respective plant systems 133, depending on the traffic direction. For example, data originating from an SZ data source to be sent to LSZ destinations, is sent to the aggregator 181 or data server 191 as a destination for data exchange, using standard APIs. Data retrieved from the LSZ DSM 132 via SAN volumes that needs to be sent to the SZ plant systems 133 will typically have the servers associated with the respective plant LAN 155 at or otherwise associated with the respective local or remote plant systems 133 as the destination, or alternatively, the actual plant system component, itself.

With respect to data originating from an LSZ data source, e.g., corporate networks, systems, and end-users, collectively referred to as corporate systems 134, the SZ DSM 131 retrieves data from the SZ DSM SAN volume, and sends the retrieved data to the respective destination server or servers associated with the respective destination plant system 133. With respect to data transitioning from SZ data sources, the respective server or servers 181, 191, at the SZ DSM 131 retrieves or receives data from the respective SZ data source.

According to an exemplary configuration, the SZ DSM 131 provides for concurrent data access from different sources in a uniform manner. The SZ DSM 131 servers and/or workstations save the data to a SZ DSM SAN volume, for example, located on or otherwise associated with the SZ-SAN storage 141, typically in the form of flat files containing printable characters, for transfer/replication to an LSZ DSM SAN volume, for example, located on or otherwise associated with an LSZ-SAN storage 142, for acquisition by the LSZ DSM 132 and access by or re-transmission to the ultimate destination. In an exemplary data transfer scheme, the flat files are transferred or replicated transparently in a write-only method utilizing the SAN infrastructure, e.g., SAN fabric 143, to the LSZ DSM SAN volume. By converting the files into flat files prior to transfer between zones, active files, those files having executable code and/or macros that cannot be transferred as a text or binary file, e.g., URL links, object oriented executable file, among others, which can be carriers of computer worms or viruses, are eliminated from the data, preventing them from being exchanged between the SZ and LSZ; vice versa.

According to an exemplary configuration, mirror volumes of the LSZ DSM SAN volumes can be utilized for respective LSZ applications requiring read and write access to the volume hosting their data. An example where both read and write access is required includes a scenario where data is being exchanged with an Oracle database on plant side to another Oracle database on the enterprise network, e.g., corporate shared packet network 179. Another example includes a scenario where a plant information (PI) system inside the plant exchanges data with the corporate network 179 at the API level, but uses the SZ DSM 131, e.g., data server 191, and SAN IM 140 to transfer the data at the I/O layer, i.e., using a non-IP protocol network connection. This mirror volume can be synchronized and broken from the LSZ DSM SAN volume in a timely interval depending on the SAN IM's capability and required overall time latency between the data source and end users. The LSZ DSM 132 can manage the time-to-complete sync allotted for synchronizing mirrored volumes based on both elapsed time for file generation and elapsed time for file read.

According to an exemplary configuration, multiple SAN volumes can be utilized. For example, each SZ DSM server 181, 191, can utilize a different single volume on the SAN storage as means for data transportation. Additionally, multi-thread data flowing within a single DSM 131 can utilize either a single volume or a separate volume per data thread. Each DSM server 181, 191, can include a DSM Loader, as would be understood by one of ordinary skill in the art, to manage data retrieval and transfer to the respective destination server within a preselected target window. Additionally, multiple DSMs can be used to support different remote locations and/or different applications, and can provide the required scalability for data processing and storage exchange time delay and storage capacity requirements.

According to an exemplary configuration, each LSZ DSM 132 server mounting the read-only volume and/or the mirror volume can read the flat data file. For time sensitive data, the data includes a timestamp, typically at the record level, to provide for advancing the priority of processing the file to the final destination. According to an exemplary processing process, the LSZ DSM 132 servers read the data from the mounted volumes and ensure that the records are synchronized with end-users servers or clients, and are up-to-date. This function can be supported by standard API technologies such as, for example, a SQL service pack and/or standard protocol such as Object Linking and Embedding, Database (OLEDB). The required snapshot event rate will depend on the SAN capabilities and on the required data latency between source and destination. The SAN snapshot event rate in exchanging the data between the two data volumes is configured to be within the application tolerance of recalling and uploading the flat file to the application layer.

Each DSM 131, 132, can include one or more flat file checkers or governors that check that only flat files are written or read from or to the SAN volumes, and/or can include other software modules for checking of files, network communication, systems and volumes for freeness from computer or network worms, viruses or compromised data sessions, and for performing advanced data transform and cleansing operations. Advantageously, the aggregator servers 181, 182, and data servers 191, 192, can provide an environment to cleanse the data before it is moved to the SAN IM 140, i.e., an advanced process before exchanging the data through the SAN IM 140. The ability to capitalize on data cleansing at the aggregator servers 181, 182, data servers 191, 192, and SAN IM 140 provides an environment for secure data transmission.

The various DSM functions can also include managing a queued events count and an archive event rate, which helps to ensure a sustainable data transmission and data integrity in the event of a component failure during the data transmission, upon the resumption of the data communication. Other DSM functions, normally supported by standard API technologies such as, for example, those supported by an SQL service pack, and/or standard application APIs, include: applying context to information to relate and visualize the information; generating advanced analytic data structures; creating dashboards for KPI analysis and visualization through integration of end user's required key performance induction for the different functions (e.g., queries, data transmission, data storage, etc.) supporting the data flow transmission; and creating and scheduling reports, performing online analytic processing and data mining, performing advanced data validation, and data transformations, and controlling validation and transformation through runtime configuration data by integrating such functions in support of the data flow transmission integrity, as understood by one of ordinary skill in the art.

Still referring to FIG. 3, as discussed above, according to an exemplary embodiment, the network platform 130 includes a SAN storage and data exchange system 140 comprising a SAN Inter-Networking Module (SAN IM) 140 positioned functionally between the SZ DSM 131 and the LSZ DSM 132, to provide for exchanging data between the SZ and the LSZ. According to an exemplary SAN IM architecture, the SAN IM infrastructure hardware of the SAN IM 140 includes an SZ SAN storage 141 labeled "Storage 1 Plant SAN," and an LSZ SAN storage 142 labeled "Storage 2 Enterprise SAN," each including one or more storage media providing at least one, but more typically, a plurality of volumes, to thereby form individual data centers assessable by their associated DSMs 131, 132. The SAN IM 140 also includes at least one SAN Switch 143 typically in the form of one or more network switches, and more typically in the form of a switched fabric 143 comprising a plurality of network switches, and more preferably in the form of the switched fabric in SCSI/fiber channel. Particularly, an exemplary SAN IM baseline architecture is based on a single SAN storage system (Storage 1 & Storage 2) utilizing a single and/or multiple storage enclosures, and the SAN switched fabric 143 including one or more SAN switches, which can provide a fault tolerant system design whereby each component is fully redundant.

An exemplary SAN IM configuration includes several unique functionalities. One of the various functionalities includes the ability of the SAN IM 140 to provide both storage capacity and data retention for both the SZ and LSZ. The SAN IM data-storage capability can advantageously be used, for example, to retain the data should the Enterprise Resource Planning (ERP) storage 135 become compromised or if data being transferred to the LSZ is being lost. The functionalities can also or alternatively include: virtual block data volumes exchange between storage based real-time data snapshots; data storage replications; managed read and write capabilities between storage volumes to service the objectives of the data flow for end-to-end applications data exchange; remote replication functionality that can include both synchronous and asynchronous modes to provide the flexibility for the data exchange transmission functions between different types of applications; and/or an ability to write the output file directly to any SAN storage volume, e.g., writing an output file comprising a virtual block of data to a flat file on a SAN storage volume for transfer across networks having either the same or disparate security levels.

The functionalities can also or alternatively include: the provision of database synchronization across systems; an ability to generate the processes necessary to transport and store the information; an ability to maintain failover and continued access, depending upon the base operating system and database and/or application capabilities; an ability to access data from disparate data sources such as process historians, relational databases, web services, and third party applications, for example, through application of the SAN storage; and/or an ability to access and transport large amounts of information on a global (i.e., large data volume) scale, implemented, for example, by interconnecting distributed remote facilities with the SDCLM 171.

The functionalities can further or alternatively include an ability to utilize non-IP communication, such as, for example, a fiberchannel protocol in communication over the fabric 143 within the SAN IM 140, between the hosts (e.g. aggregators 181, 182, and data servers 191, 192) of the SZ and LSZ DSMs 131, 132, and their respective storage volumes at 141, 142. The DSMs 131, 132, can be physically located in close proximity or can be far apart as far as the SAN fabric capability can provide for.

Still further, the functionalities can also or alternatively include: the ability to create, develop, and assign values, to perform bulk copy, to extract retries based on failure between the DSM 131, 132, and data source, to log retry exceptions, to transform retries, and/or to provide for dynamic and site specific control of extract, transform, load (ETL) packages, utilizing available API technologies such SQL service pack and/or standard application APIs.

Figure 4:
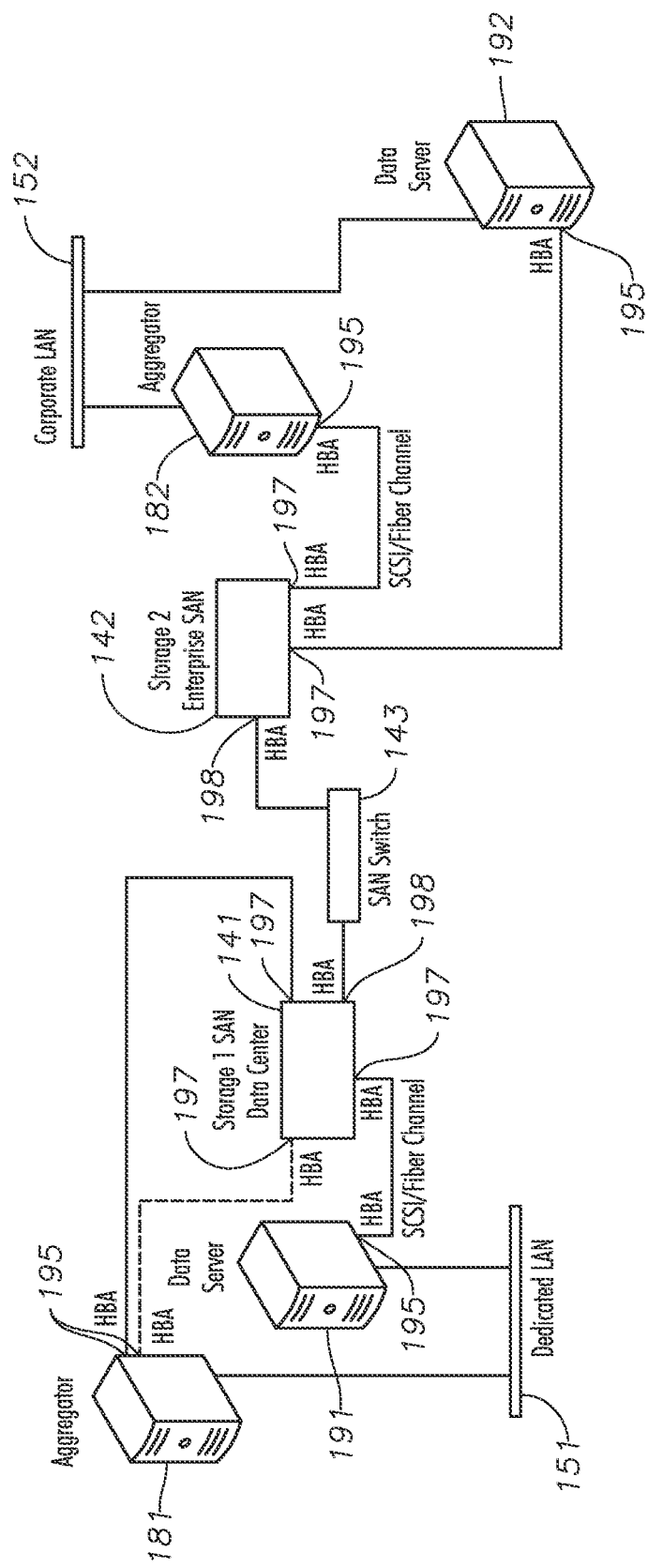
FIG. 4 is a graphical diagram of an exemplary centralized facility illustrating connections of a plurality of host bus adapters, according to an embodiment of the present invention.

Referring also to FIG. 4, each DSM system 181, 182, 191, 192, of the SZ and LSZ DSMs 131, 132, requiring access to the data source or destination, can have one or more Host Bus Adapters (HBAs) 195 configured to provide connectivity with its associated SAN IM storage 141, 142, also having at least a corresponding one or more HBAs 197. Additionally, each SAN IM storage 141, 142, can also have at least one HBA 198 to connect to the SAN fabric switch 143. Zones, as would be understood by person of ordinary skill in the art, in the SAN fabric switch 143 can be created to ensure that each DSM system 181, 182, 191, 192, has access only to the storage volume that it is assigned to.

Figure 5:
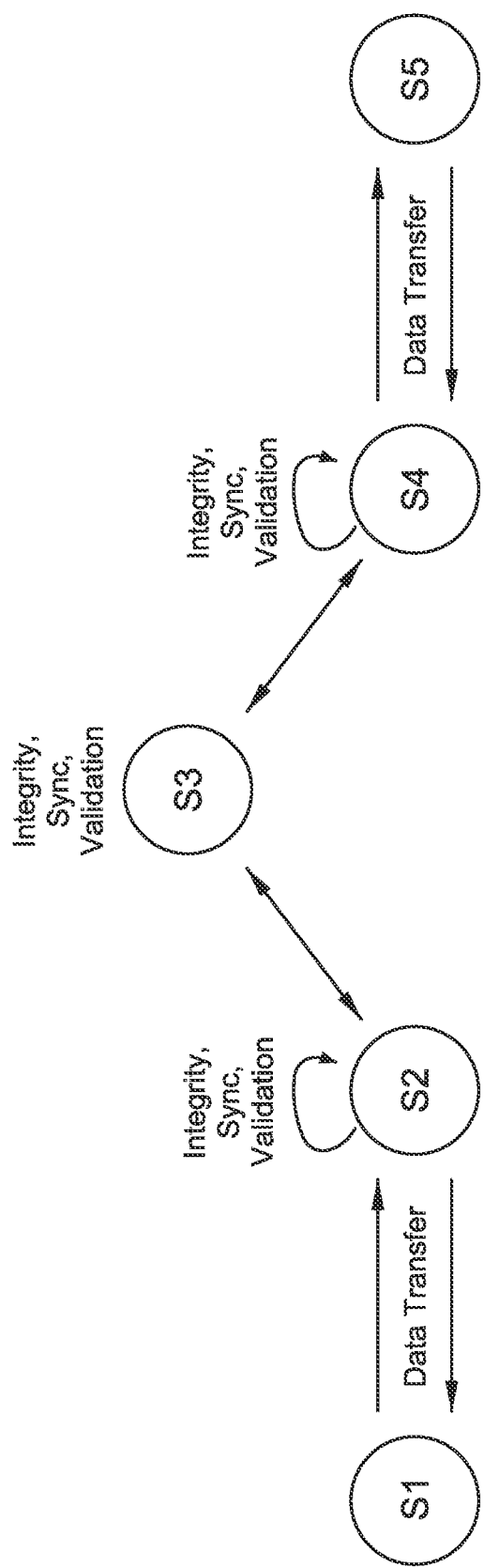
FIG. 5 is a graphical diagram illustrating data processing steps and data flow between plant networks and systems, located in a secured zone, and corporate networks and systems, located in a less secured zone, through the exemplary centralized facility of FIG. 4, according to an embodiment of the present invention.

FIG. 5 summarizes the data processing steps and data flow from the plant systems 133 represented by node S1, to the corporate systems 134 represented by node S5, as a result of the processing performed by the SZ DSM 131 represented by node S2, the SAN IM 140 represented by node S3, and the LSZ DSM 132 represented by node S4. As described above, the dataflow between S1 and S2 involves a native file data exchange based on standard API. The dataflow from node S2 to node S3 represents the generation (conversion) of the native file into a flat file and storage in a block storage volume. At node S3, copies of the flat files transition through the SZ and LSZ portions of the SAN IM 140. The dataflow from node S3 to node S4 represents the retrieval or transfer of a flat file from node S3 to node S4, followed by a conversion of the flat file into a native file native to the systems, networks, and/or end-users represented by node S4. The dataflow from node S4 to node S5 correspondingly represents the retrieval or transfer of the native file to node S5. Dataflow in the opposite direction, i.e., from nodes S5 to S1 is the reverse of the above.

Figure 6:
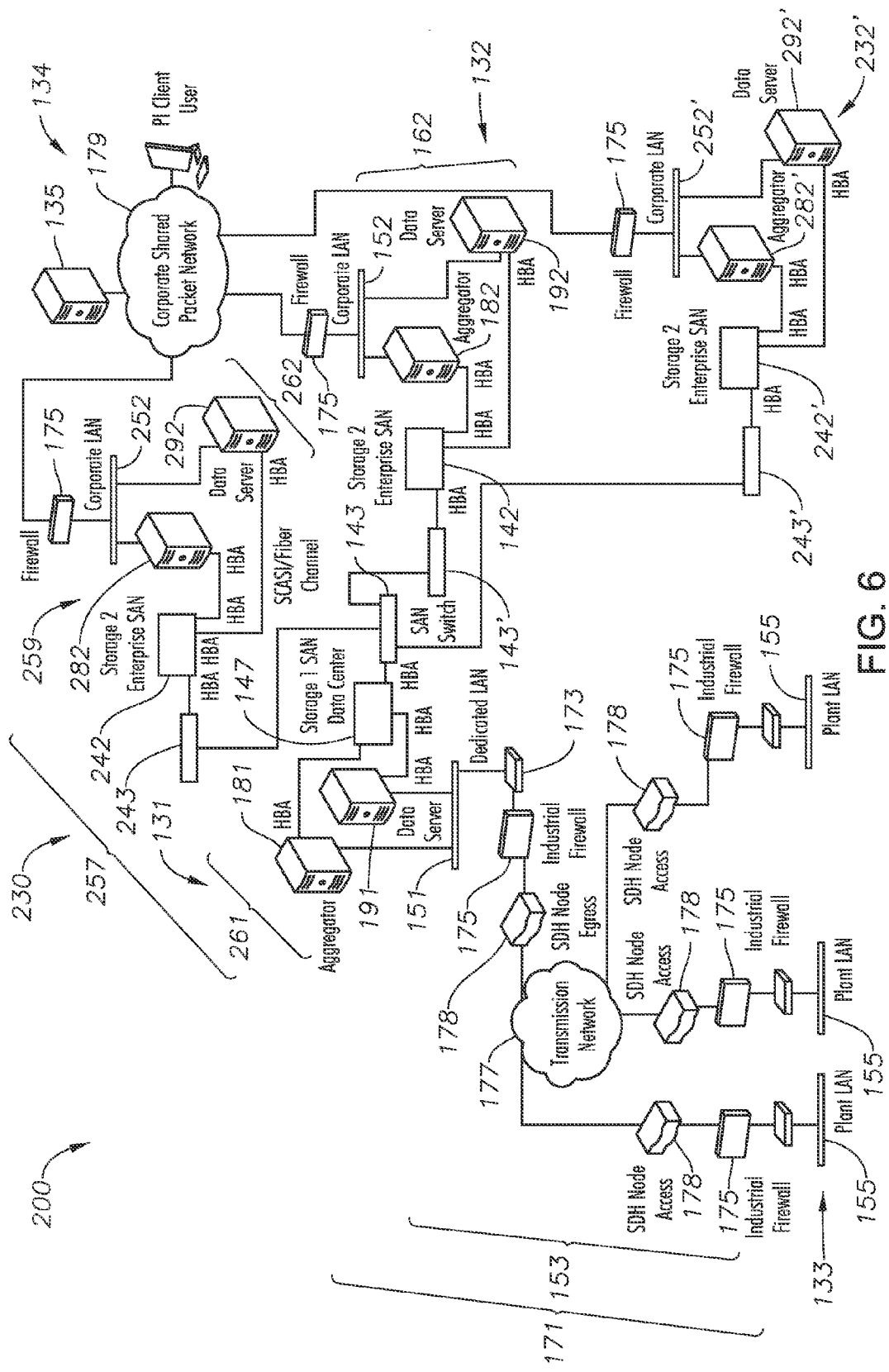
FIG. 6 is a graphical diagram illustrating an exemplary apparatus including an exemplary network platform containing a distributed facility in the form of a distributed storage area network data exchange model, according to an embodiment of the present invention.

Although described primarily in relation to a centralized SAN data exchange model, various embodiments provide platforms that utilize a distributed SAN data exchange model. For example, FIG. 6 illustrates an apparatus 200 comprising an exemplary network platform 230 including a distributed facility 257 in the form of a distributed SAN data exchange model. The distributed SAN data exchange model is similar to the centralized SAN data exchange model illustrated in FIG. 3, except at least some of the SZ plant systems 133 are connected from different locations to the corporate shared packet network 179 via multiple geographically separated pathways to communicate with corporate systems 134. Additionally, three separate secure zones are provided between the SZ firewalls 175 and the firewalls 175 adjacent the three corporate LAN interfaces to the LSZ.

In the model illustrated in FIG. 6, the three corporate LANs 152, 252, 252' represent either three separate portions of the same corporate LAN 152, illustrated in FIG. 3, being accessed at three separate locations; or represent three separately located different Enterprise (e.g. corporate) LANs 152, 252, 252', typically in the form of shared packet networks, interfacing with three corresponding separate Storage 2 infrastructures 162, 262, 262' commonly interfacing with the same Storage 1 infrastructure 161 to connect to the plant systems 133, and each connected to the corporate network 179 via different pathways to provide a communication pathway to the corporate systems 134 to provide for enhanced data exchange between the corporate systems 134 and the plant systems 133.

In the illustrated embodiment, the SAN fabric switch 143 is connected with three LSZ SAN fabric switches 143', 243, 243'. The first of the three LSZ SAN fabric switches 143' is interfaced with the LSZ SAN storage 142 to provide for file acquisition by the LSZ DSM 132, i.e. aggregator 182 and/or data server 192, and access by or retransmission to the ultimate destination via the corporate LAN 152 and the corporate network 179, as described with respect to FIG. 3. The second of the three LSZ SAN fabric switches 243 is interfaced with a second LSZ SAN storage 242 to provide for file acquisition by a second LSZ DSM 232, i.e. aggregator 282 and/or data server 292, and access by or retransmission to the ultimate destination via the corporate LAN or LAN segment 252 and the corporate network 179, to provide a second pathway to the corporate systems 134. The third of the three LSZ SAN fabric switches 243' is interfaced with a third LSZ SAN storage 242' to provide for file acquisition by a third LSZ DSM 232', i.e. aggregator 282' and/or data server 292', and access by or retransmission to the ultimate destination via the corporate LAN or LAN segment 252' and the corporate network 179, to provide a third pathway to the corporate systems 134.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although primarily described with respect to support of hydrocarbon, power, oil and gas field data exchange delivery, those of ordinary skill in the art would recognize that the scope of the various illustrated embodiments of the present invention described herein are readily applicable to other industrial and non-industrial applications, networks, and facilities.

That claimed is:

1. A cyber security protection system comprising:
   a first set of one or more computers defining a first data staging module (DSM) associated with a first network zone having a first level of network security, and configured to obtain data from one or more secured networked members associated with the first network zone;

a second a set of one or more computers defining a second DSM associated with a second network zone having a second level of security, and configured to obtain data from one or more networked enterprise members associated with the second network zone; and a storage area network (SAN) storage and exchange system operably coupled to the first and second DSMs, the SAN storage and exchange system comprising:
one or more SAN storage units comprising:
a first set of one or more storage volumes accessible by the first DSM; and
a second set of one or more storage volumes accessible by the second DSM; and
a non-transitory communication medium configured to provide for data communications between the first set of one or more storage volumes and the second set of one or more storage volumes to thereby provide a data pathway between the first network zone and the second network zone,
wherein the SAN storage and exchange system is configured to perform communication of data between the first set of one or more storage volumes and the second set of one or more storage volumes using a non-Internet protocol (IP) based communications scheme, wherein the non-IP based communications scheme comprises transferring flat files between the first and second sets of one or more storage volumes, wherein the flat files comprise text files generated from corresponding native files received by the first DSM for transfer to the second DSM or native files received by the second DSM for transfer to the first DSM.

2. The system as defined in claim 1, wherein the native files comprise active files comprising executable code, and wherein the SAN storage and exchange system is configured to prevent uninterrupted application-to-application layer and uninterrupted IP network layer communications of active files between the one or more secured networked members and the one or more networked enterprise members.

3. The system as defined in claim 1,
wherein the first set of one or more storage volumes are separately dedicated for direct access by the first DSM and are not directly accessible by the second DSM; and
wherein the second set of one or more storage volumes are separately dedicated for direct access by the second DSM and are not directly accessible by the first DSM.

4. The system as defined in claim 1,
wherein the communication of data between the first set of one or more storage volumes and the second set of one or more storage volumes comprises virtual block data volumes replication on one of the first and the second network zones and a storage exchange to the other of the first and the second network zones; and
wherein the first DSM, the second DSM, and the SAN storage and exchange system define a SAN storage infrastructure configured to perform the virtual block data volumes replication and storage exchange.

5. The system as defined in claim 1,
wherein the first DSM is configured to employ an application-to-application layer communications scheme when obtaining data from or providing data to at least one member of the one or more secured networked members;
wherein the second DSM is configured to employ the application-to-application communication scheme when forwarding data to or obtaining data from at least one of the one or more networked enterprise members; and
wherein the first and the second DSM are configured to employ a non-IP-based communications scheme when exchanging or transferring data therebetween, to interrupt any application-to-application data transfer or exchange between the at least one member of the one or more secured networked members and the at least one member of the one or more networked enterprise members.

6. The system as defined in claim 1, wherein the SAN storage and exchange system is configured to employ one or both of the following communication schemes:
a first communication scheme comprising data communication between one or more associated pairs of the first and the second sets of storage volumes performed at a storage exchange, virtual block, or input/output (I/O) level to provide non-IP based communications data exchange between one of the secured networked members and one of the networked enterprise members; and
a second communication scheme comprising the data communication between the one or more associated pairs of the first and the second sets of storage volumes using a storage exchange, virtual block, or I/O layer to provide non-IP based communications data exchange between one of the one or more secured networked members and one of the one or more networked enterprise members.

7. The system as defined in claim 1, wherein the network platform is configured so that:
communication of data from a member of the one or more secured networked members to the first DSM or retrieval of data from the one or more secured networked members by the first DSM for communication to a member of the one or more networked enterprise members, and communication of data obtained from the SAN storage and exchange system from the first DSM to or retrieval by the member of the one or more secured networked members, is performed utilizing an IP based communications scheme;
communication of data from a member of the one or more networked enterprise members to the second DSM or retrieval of data from the one or more networked members by the second DSM for communication to the member of the one or more secured networked members, and communication of data obtained from the SAN storage and exchange system from the second DSM to or retrieval by the member of the one or more networked enterprise members, is performed utilizing an IP based communications scheme; and
communication of data between the first DSM and the second DSM is performed using the non-IP based communications scheme.

8. The system as defined in claim 7, wherein the first set of one or more storage volumes are separately dedicated for direct access by the first DSM and are not directly accessible by the second DSM, wherein the second set of one or more storage volumes are separately dedicated for direct access by the second DSM and are not directly accessible by the first DSM, wherein the non-IP based communications scheme comprises transferring flat files between associated pairs of the separately dedicated first and second sets of one or more storage volumes, the flat files being generated from native files containing the data communicated to and received by the respective first and the second DSMs for transfer to respective other of the first and the second DSMs.

9. The system as defined in claim 8, wherein the first set of one or more storage volumes comprise a first set of one or more block storage volumes, wherein the second set of one or more storage volumes comprise a second set of one or more block storage volumes, and wherein the non-IP based communications scheme comprises one or both of the following set of operations:

the first DSM converting one or more native files native to a communication application utilized by and obtained from the member of the one or more secured networked members into one or more flat files and storing the one or more flat files in a block storage volume of the first set of one or more block storage volumes, the storage and exchange system performing transferring a copy of the block storage volume to a block storage volume of the second set of block storage volumes, and the second DSM regenerating the one or more flat files into one or more native files native to a communication application utilized by the member of the one or more networked enterprise members and providing for transition of a copy of the regenerated one or more native files to the member of the one or more networked enterprise members; and the second DSM converting one or more native files native to the communication application utilized by and obtained from the member of the one or more networked enterprise members into one or more flat files and storing the one or more flat files in a block storage volume of the second set of one or more block storage volumes, the storage and exchange system performing transferring a copy of the block storage volume to a block storage volume of the first set of block storage volumes, and the first DSM regenerating the one or more flat files into one or more native files native to the communication application utilized by the member of the one or more secured networked members and providing for transition of a copy of the regenerated one or more native files to the member of the one or more secured networked members.

10. The system as defined in claim 1,
wherein the first DSM is configured to translate one or more native files retrieved or received from a secured network member of the secured networked members into one or more flat files and to store the one or more flat files on a storage volume of the first set of one or more storage volumes, the one or more native files being native to the secured network member;
wherein the SAN storage and exchange system is configured replicate the storage volume of the first set of one or more storage volumes to another storage volume of the second set of one or more storage volumes thereby replicating the one or more flat files; and
wherein the second DSM is configured to retrieve or receive the replicated one or more flat files, and to translate the one or more replicated flat files into one or more native files being native to a destination member of the networked enterprise members.

11. The system as defined in claim 1,
wherein the one or more SAN storage units comprises:
a first SAN storage unit operably coupled to the first DSM and configured to contain the first set of one or more storage volumes,
a second SAN storage unit operably coupled to the second DSM and configured to contain the second set of one or more storage volumes, and wherein the non-transitory communication medium is operably coupled between the first SAN storage unit and the second SAN storage unit and configured to provide for data communication between the first SAN storage unit and the second SAN storage unit.

12. The system as defined in claim 11, wherein:
the non-transitory communication medium comprises a SAN switch or fabric comprising one or more SAN switches defining a switched fabric;
the data communication between the first SAN storage unit and the second SAN storage comprises a data communication between one or more associated pairs of the first and the second sets of storage volumes,
a first storage volume of each pair of storage volumes is directly accessible by the first DSM and is not directly accessible by the second DSM, and
a second storage volume of each pair of storage volumes is directly accessible by the second DSM and is not directly accessible by the first DSM.

13. The system as defined in claim 12, wherein the data communication between the first SAN storage unit and the second SAN storage unit comprises:
a data replication and block volume transfer between a first storage volume and a second storage volume of each pair of one or more associated pairs of the first and the second sets of storage volumes.

14. The system as defined in claim 1,
wherein the first DSM comprises an aggregator server and a data server;
wherein the aggregator is positioned and configured to collect data from the one or more secured networked members by establishing one or more of the following: communications, databases templates queries, data exchanges, a data filing library or libraries for at least one of the one or more secured networked members, the at least one of the one or more secured networked members comprising a plant or facility, an individual component of the plant or facility, or a combination thereof; and
wherein the data server is positioned and configured for supporting data communications at one or more application to application layers by utilizing one or more transmission control protocol (TCP)/IP or user datagram protocol (UDP/IP) ports.

15. The system as defined in claim 1, wherein the second level of security is less than the first level of security, wherein the first network zone is a secured zone (SZ), and wherein the second network zone is a less secured zone (LSZ).

16. The system as defined in claim 15,
wherein the first DSM is configured to perform the operation of translating data files sourced from a member of the one or more secured networked members contained within the SZ into plain text files for replication and transfer to one or more storage volumes of the second set of one or more storage volumes by the SAN storage and exchange system; and
wherein the second DSM is configured to perform the operation of re-translating the plaintext files into a native file format usable by a destination member of the one or more networked enterprise members for retrieval thereby or transmission thereto.

17. The system as defined in claim 15, wherein the first DSM is operably coupled to the SZ and to the second DSM, and wherein the first DSM is configured to function as a buffer and staging area to collect all data exiting the SZ to the LSZ and all data entering the SZ from the LSZ.

18. The system as defined in claim 17,
wherein the second DSM is operably coupled to the LSZ to collect data entering the LSZ from the SZ and all data exiting the LSZ to the SZ; and
wherein the SAN storage and exchange system is configured.

19. The system as defined in claim 15, wherein the SAN storage and exchange system comprises a SAN internetworking module (IM), and wherein the cyber security protection system further comprises:
a secured link containing a non-shared IP packet network, the non-shared IP packet network comprising a centralized facility, the centralized facility comprising the first DSM, the second DSM, and the SAN IM,
the centralized facility further comprising:
a dedicated local area network operably coupled with the first DSM and the SZ through a first network security device to provide for communication between the first DSM and one or more computer servers contained within the SZ, and
a corporate local area network operably coupled with the second DSM and the LSZ through a second network security device to provide for communication between the second DSM and one or more computer servers or end-user devices contained within the LSZ.

20. The system as defined in claim 19, wherein the cyber security protection system further comprises a secured dedicated communication link module (SDCLM) positioned to provide secured communication with a data transmission network, the apparatus comprising:
an Ethernet switch to establish a dedicated local area network;
a network security device defining a network firewall positioned to protect the local area network; and
a communications channel comprising a conduit comprising a dedicated fiber strand, cable, or fiber strand and cable, bounded by the network firewall and positioned to provide communication pathway to the data transmission network located external to the network firewall; and
wherein the first DSM is operably coupled to the SZ via the SDCLM.

21. The system as defined in claim 20,
wherein the communications channel is based on one or more dedicated channels comprising one or more of the following: synchronous digital hierarchy (SDH), synchronous optical networking (SONET), and wave division multiplexing, and is configured for dedicated IP over Ethernet, serial communication over the communication channel, or both dedicated IP over Ethernet and serial communication over the communications channel; and
wherein the SDCLM is configured to be non-public or shared private IP, to track events, and to monitor for and produce alerts of cyber security compromises.

22. The system as defined in claim 21,
wherein the SZ encompasses the one or more secured network members;
wherein the one or more secured network members comprise mission-critical remote or local plants, facilities, systems, networks, applications, controllers, computers or other data management devices, sensors or other data collecting or transmitting devices including I/O devices, equipment, or a combination thereof;
wherein the LSZ encompasses the one or more networked enterprise members; and
wherein the one or more networked enterprise members comprise non-mission-critical remote or local facilities, systems, networks, computers or other user interface device, or a combination thereof.

23. The system as defined in claim 1, wherein the cyber security protection system further comprises a centralized or distributed facility,
the centralized or distributed facility configured to form a non-shared hybrid IP packet network providing a cyber secure communications medium for providing data between each member of the one or more secured network members and each member of the one or more networked enterprise members,
the non-shared hybrid IP packet network configured to provide an IP-based communication channel interrupted by a non-IP-based communications channel portion that does not support IP-based communications.

24. The system as defined in claim 23,
wherein the data communications comprise virtual block data volumes replication on one of the first and the second network zones and storage exchange to the other of the first and the second network zones; and
wherein the first DSM, the second DSM, and the SAN storage and exchange system define a SAN storage infrastructure configured to perform the virtual block data volumes replication and exchange;
wherein the central facility comprises the SAN storage infrastructure bounded by a dedicated LAN within the first network zone and a non-dedicated LAN within the second network zone to provide IP communications therebetween.

25. A cyber security protection system comprising:
a first set of one or more computers defining a first data staging module (DSM) associated with a first network zone having a first level of network security, and configured to obtain data from one or more secured networked members associated with the first network zone;
a second set of one or more computers defining a second DSM associated with a second network zone having a second level of security, and configured to obtain data from one or more networked enterprise members associated with the second network zone; and
a storage area network (SAN) storage and exchange system operably coupled to the first and second DSMs, the SAN storage and exchange system comprising:
a first SAN storage unit comprising a first set of one or more storage volumes accessible by the first DSM,
a second SAN storage unit comprising a second set of one or more storage volumes accessible by the second DSM, and
a SAN switch or fabric containing one or more SAN switches defining a switched fabric, the switched fabric operably coupled between the first SAN storage unit and the second SAN storage unit and configured to provide for non-Internet protocol (IP) based data communication between the first SAN storage unit and the second SAN storage unit to thereby provide a data pathway between the first network zone and the second network zone, the non-IP based data communication comprising transfer of flat files between the first SAN storage unit and the second SAN storage unit, the flat files comprising text files generated from corresponding native files received by the first DSM for transfer to the second DSM or from corresponding native files received by the second DSM for transfer to the first DSM.

26. The system as defined in claim 25, wherein:
the data communication between the first SAN storage unit and the second SAN storage comprises a data communication between one or more associated pairs of the first and the second sets of storage volumes,
a first storage volume of each pair of storage volumes is directly accessible by the first DSM and is not directly accessible by the second DSM, and
a second storage volume of each pair of storage volumes is directly accessible by the second DSM and is not directly accessible by the first DSM.

27. The system as defined in claim 25, wherein the data communication between the first SAN storage unit and the second SAN storage unit comprises a data replication and block volume transfer between a first storage volume and a second storage volume of each pair of one or more associated pairs of the first and the second sets of storage volumes.

28. The system as defined in claim 25, further comprising a centralized facility configured to form a non-shared hybrid IP packet network providing a cyber secure communications medium for providing data between each member of the one or more secured network members and each member of the one or more networked enterprise members, the centralized facility configured to provide an IP-based communication channel interrupted by a non-IP based communications channel portion that does not support IP-based communications;
wherein the first DSM is configured to communicate over a portion of the IP based communication channel to provide for data transfer to or receipt or retrieval from members of the one or more secured networked members that utilize IP communications as their communication base;
wherein the second DSM is configured to communicate over a second portion of the IP based communication channel to provide for data transfer to or receipt or retrieval from members of the one or more networked enterprise members that utilize IP communications as their communications base; and
wherein the first DSM and the second DSM are configured to communicate over the non-IP based communications channel portion when exchanging or transferring data therebetween is performed using a non-IP-based communications scheme to thereby prevent any direct IP based connections between the one or more secured networked members and the one or more networked enterprise members.

29. A cyber security protection system comprising:
a first data staging module (DSM) comprising a first set of one or more computer servers positioned within a first secured network zone (SZ) having a first level of network security, wherein the SZ comprises one or more mission critical data sources, and wherein the first DSM is configured to obtain data from the one or more networked mission critical data sources of the SZ;
a second DSM comprising a second set of one or more computer servers positioned within a second secured network zone (LSZ) having a second level of network security, the second level of network security being less than the first level of network security, wherein the LSZ comprises one or more non-mission critical data consumers, wherein the second DSM is configured to provide data to the one or more non-mission critical data consumers of the LSZ, and wherein the one or more mission critical data sources of the SZ are configured to communicate with one or more non-mission critical data consumers of the LSZ; and
a storage area network (SAN) storage and exchange system configured to exchange data between the SZ and the LSZ, and configured to provide non-Internet protocol (IP) communication between the first DSM and the second DSM to prevent establishment of an IP connection between the SZ and the LSZ to thereby provide secured communication between the SZ and the LSZ,
the SAN storage and exchange system comprising:
a first set of storage volumes accessible by the first DSM; and
a second set of storage volumes accessible by the second DSM,
the non-IP based data communication comprising transfer of flat files between the first set of storage volumes accessible by the first DSM and the second set of storage volumes accessible by the second DSM, the flat files comprising text files generated from corresponding native files received by the first DSM for transfer to the second DSM or native files received by the second DSM for transfer to the first DSM.

30. The system as defined in claim 29,
wherein the first set of storage volumes comprises a dedicated SZ DSM SAN volume dedicated for use by the first DSM, and the second set of storage volumes comprises a dedicated LSZ SAN DSM volume dedicated for use by the second DSM.

31. The system as defined in claim 29,
wherein the first and second sets of storage volumes of the SAN storage and exchange system comprise a pair of separately dedicated real storage volumes; and
wherein the non-IP communication between the first DSM and the second DSM comprises translating native files from the SZ into plain text files, transferring the plain text files between the pair of separately dedicated storage volumes, and retranslating the plain text files into a form utilized by the LSZ.

32. The system as defined in claim 29, wherein the SAN storage and exchange system comprises:
a SAN switch or fabric containing one or more SAN switches defining a switched fabric; and
a pair of SAN interfaces connected to opposite communication ends of the switched fabric, a first SAN interface of the pair of SAN interfaces, configured to communicate with the first DSM to transfer data received from the LZ to the switched fabric, and a second SAN interface of the pair of SAN interfaces, configured to communicate with the second DSM to transfer data received from the switched fabric to the LSZ.

33. A method of providing cyber security protection, the method comprising the steps of:
receiving, by a first computer server of a first data staging module (DSM) associated with a first network zone (SZ) having a first level of network security and from at least one member of one or more secured network members of the first network zone, native files for transfer to a second DSM associated with a second network zone (LSZ) having a second level of network security, the second level of network security being less than the first level of network security;

translating, by the first computer server of the first DSM, the native files into one or more flat files, wherein the one or more flat files comprises one or more plain text files;

communicating, by a storage area network (SAN) storage and exchange system via non-Internet protocol (IP) communication, copies of the one or more flat files between a pair of SAN storage volumes, the pair of SAN storage volumes comprising:
  a first set of one or more storage volumes accessible by the first DSM associated with the SZ; and
  a second set of one or more storage volumes accessible by the second DSM associated with the LSZ, and
the non-IP based data communication comprising transfer of the one or more flat files from the first set of one or more storage volumes accessible by the first DSM to the second set of one or more storage volumes accessible by the second DSM; and receiving, by a second computer server of the second DSM, the copies of the one or more flat files; and re-translating, by the second computer server of the second DSM, the copies of the one or more flat files into a form usable by the second LSZ.

34. The method as defined in claim 33, wherein the non-IP based data communication is configured to prevent establishment of an IP connection between the SZ and the LSZ to thereby provide secured communication between the SZ and the LSZ.

35. The method as defined in claim 33, wherein the native files comprise active files comprising executable code.

36. A system comprising:
a first DSM comprising a first network data server communicatively coupled to a first set of network devices communicatively coupled to a first network, the first network having a first level of network security, the first network data server configured to obtain data from the first set of network devices;

a second DSM comprising a second network data server communicatively coupled to a second set of network devices communicatively coupled to a second network that is different from the first network, the second network having a second level of network security, the second network data server configured to provide data to the second set of network devices;

a storage area network (SAN) storage and exchange system configured to provide for the transfer of data between the first DSM and the second DSM via a non-Internet protocol (IP) based communications scheme, the SAN storage and exchange system comprising:
  a first storage volume communicatively coupled to the first network data server;
  a second storage volume communicatively coupled to the second network data server; and wherein the first network data server configured to:
  obtain, from a network device of the first set of network devices via an IP based communications scheme, an native file comprising executable code;
  generate a text file corresponding to contents of the native file; and
  execute a storage operation to cause the text file to be stored on the first storage volume;

wherein the SAN storage and exchange system configured to transfer the text file from the first storage volume to the second storage volume using the non-Internet protocol (IP) based communications scheme;

the second network data server configured to:
  obtain, from the second storage volume, the text file transferred to the second storage volume;
  generate a native file corresponding to contents of the text file transferred to the second storage volume; and
  transfer, to a network device of the second set of network devices, via an IP based communications scheme, the native file.

* * * * *